(12) United States Patent
Kim

(10) Patent No.: US 12,319,472 B2
(45) Date of Patent: Jun. 3, 2025

(54) COMPRESSION BASED FISH HOOK HOLDING DEVICE

(71) Applicant: Edward Kim, Somerset, NJ (US)

(72) Inventor: Edward Kim, Somerset, NJ (US)

(73) Assignee: Weekend Warrior Fishing LLC, Somerset, NJ (US)

( * ) Notice: Subject to any disclaimer, the term of this patent is extended or adjusted under 35 U.S.C. 154(b) by 15 days.

(21) Appl. No.: 18/352,360

(22) Filed: Jul. 14, 2023

(65) Prior Publication Data
US 2025/0019120 A1    Jan. 16, 2025

(51) Int. Cl.
*B65D 25/10* (2006.01)

(52) U.S. Cl.
CPC .................. *B65D 25/101* (2013.01)

(58) Field of Classification Search
CPC ......... A01K 83/00; A01K 97/06; B65D 25/10
USPC ............. 206/315.11, 380–383, 523
See application file for complete search history.

(56) References Cited

U.S. PATENT DOCUMENTS

| | | | | |
|---|---|---|---|---|
| 4,121,368 A * | 10/1978 | Norwood | ............... | A01K 83/00 43/57.1 |
| 4,243,140 A * | 1/1981 | Thrun | ............... | A61B 50/31 206/382 |
| 2004/0074136 A1* | 4/2004 | Moss | ............... | A01K 97/06 43/57.1 |
| 2009/0119974 A1* | 5/2009 | Rieux | ............... | A01K 97/06 43/57.2 |
| 2009/0321456 A1* | 12/2009 | Yang | ............... | B65D 5/509 220/600 |
| 2023/0232804 A1* | 7/2023 | Johnson | ............... | B65D 43/22 206/315.11 |

* cited by examiner

*Primary Examiner* — Bryon P Gehman
(74) *Attorney, Agent, or Firm* — Bochner PLLC; Andrew D Bochner; Eric R Kleinertz

(57) ABSTRACT

A fishhook carrying device has a resilient prismatic block, of which two adjacent faces are cut into by at least one set of spaced grooves extending along a longest dimension thereof. Two opposite parallel grooveless faces thereof abut two rigid exterior walls, which, along with a connecting bottom wall, form a unitary box structure. Rigid exterior walls of either side of the box structure maintain the prismatic block in a compressed form such that interior walls of each groove are pressed against each other in a first resting condition. When a flange is inserted into a pressed groove, the interior walls of the groove resiliently separate and thereafter abut the flange, frictionally holding the flange in place. The interior groove walls return to the first resting condition upon removal of the flange from the device.

19 Claims, 5 Drawing Sheets

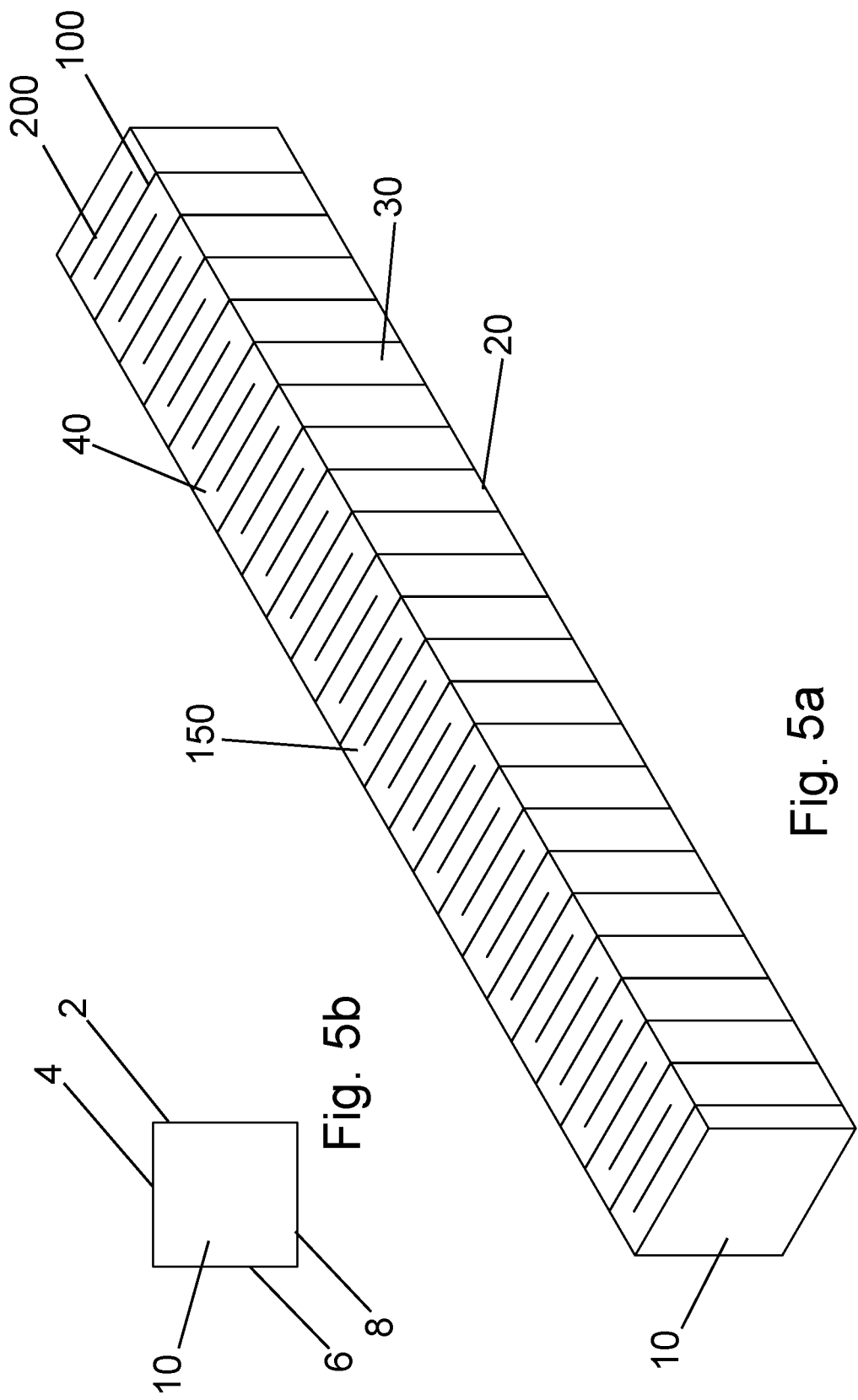

COMPRESSION BASED FISH HOOK HOLDING DEVICE

FIELD OF THE INVENTION

The present invention relates to storage and transport devices and, more specifically, to a technology for storing and transporting devices with rigid attachment flanges including fishing lures and jewelry.

BACKGROUND

Fishing is a popular recreational activity enjoyed by millions of people worldwide. Anglers often carry a wide variety of fishing hooks and lures to accommodate different fishing techniques, bait types, and target fish species. However, managing and organizing these fishing hooks and lures can be a challenge due to their small size and sharp barbs. Traditional storage methods, such as tackle boxes, often result in tangled hooks, making it difficult to access and identify specific hooks when needed. Furthermore, the sharpness of the hooks may become dull, due to the hooks banging into one another during transport. This reduces the overall efficacy of the hooks in latching onto fish, thereby necessitating anglers to replace equipment.

Existing solutions in the market lack a specialized carrying case that effectively prevents tangling and ensures the safe transportation of fishing hooks as well as being able to store a wide variety of varying sizes. There is a need for an improved fish hook carrying case that offers a compact design, reliable hook storage, and user-friendly features to address the limitations of current storage options.

SUMMARY

A fishhook storage device has at least one set of evenly spaced parallel grooves within a resilient prismatic block. These grooves are cut into two faces of the resilient prismatic block that are next to one another. The grooves are held shut with interior walls of each groove pushed taut against one another along their sides. This is done by snugly and tightly placing the block between two side rigid exterior walls which are held in place relative to one another.

Some embodiments of the disclosed technology also have a second set of evenly spaced parallel grooves. Each groove of this set cuts into two faces of the resilient prismatic block that are next to each other. One shared face is cut into by both the first and second sets of parallel grooves in such embodiments. All the grooves of both sets of grooves may be parallel to one another and run along the shared face (in addition to one other face, different for each set of grooves). Furthermore, the placement of both sets of grooves may be such that when running along the length of the shared face, the grooves alternate between grooves of the first set and grooves of the second set. Every groove may traverse a same line of symmetry of the shared face (In one dimension, every individual groove may or does overlap every other individual groove).

The device, in some embodiments, also has at least three rigid exterior walls: a rigid first side exterior wall, a rigid second side exterior wall, and a rigid bottom exterior wall. The two rigid side exterior walls may both be perpendicular to the rigid bottom exterior wall. These three rigid exterior walls may form a unitary structure. The two rigid side exterior walls each extend substantially along a grooveless face respectively. The rigid bottom exterior wall extends substantially and/or fully along a first end face of the resilient prismatic block. The resilient prismatic block may be substantially and/or fully secured in place by compression with respect to the unitary structure. This compression acts along a length of the resilient prismatic block between the two grooveless faces.

Each groove of the device may have a first interior side wall which is compressed against a second interior side wall, both of which can be resiliently and non-destructively deformable. In some embodiments thereof, at least one groove has a removable flange frictionally held within. This flange separates the two interior side walls of the groove, at least in part, away from one another. The flange may be a metal hook of a fishing lure that is held in place inside the groove with respect to the unitary structure. When the flange is removed from the groove, the two interior side walls of the groove return to touching and being compressed against one another. A length of the longest face of the resilient prismatic block may be substantially equivalent to the distance between the two rigid exterior side walls, while the respective interior side walls of each groove are compressed against one another respectively.

Described in another way, a fishhook storage device has multiple spaced apart portals within an elongated, resilient, and compressible holder. The spaced apart portals may be two sets of spaced apart portals, which extend alternatingly along a longest side of the compressible holder. Both sets of portals may be cut into two adjacent faces respectively, with one of the faces cut into by both sets of portals. The holder is pressed against two walls, one wall at a first end and another wall at a second end of the holder. Each wall on either end of the holder may be a wall of a container having a bottom wall joining between each side wall on either end of the holder.

Each portal is pressed closed and spreadable and openable when a resilient flange is placed within. The resilient flange may be a metal hook of a fishing lure with a sharp end protected within a portal and frictionally held therein.

Frictional forces may be the only or single force substantially holding the resilient flange in place within the portal. The metal hook is held stationary with respect to the compressible holder when the medal hook is within and spreading apart the portal. When a flange is removed from a portal, the portal reverts to a non-spread condition.

In addition to definitions found in the detailed description, the following definitions are used to interpret the claim language.

"Resilient" is defined as "having structural integrity such that a shape or configuration thereof is designed to be at least one hundred or more times, substantially and/or entirely, reassumed after the cessation of an application of force for which an object is designed or anticipated to encounter while using the object for purposes described in the patent application."

"Prismatic" is defined as "comprising a polyhedron with two polygonal faces (or at least a majority thereof) lying substantially and/or fully in parallel planes and with the other faces substantially and/or fully being parallelograms."

"Groove" or "portal" is defined as "a channel or depression comprising at least two interior side walls, wherein the depth of the channel or depression is at least five times greater than the width thereof."

"Face" is defined as a "substantially or fully planar side or surface of a polyhedron (or at least a majority thereof being as such)".

"Rigid" is defined as "having structural integrity such that a shape or configuration thereof is substantially and/or entirely maintained upon an application of force for which an object is designed to encounter during anticipated use for which the object is designed."

"Grooveless" is defined as "having no groove along a specified surface and/or having a at least substantially uninterrupted planar face".

"Exterior" is defined as "forming, situated on, or relating to the outermost edge, side, or boundary of a device or object modified thereby".

"Longest linear length" is defined as a "longest possible measure of distance and/or length along a line segment bounded by the edges of a surface, wherein the line segment is parallel to at least one edge of the surface."

"Non-destructively deformable" is defined as "having the capability to repeatedly (at least 100 times) assume a non-initial configuration or positioning under the application of an anticipated force encountered during uses of a device described herein and reassumes an initial configuration or positioning thereafter removing the anticipated force)."

"Frictionally" is defined as "substantially and/or entirely caused by frictional forces".

"Frictionally held" is defined as "maintaining an object in place relative to another object frictionally."

"Interior side" is defined as "forming, situated on, and/or relating to a non-exterior side of a device."

"Flange" is defined as "a shaft which is a long, narrow portion of an object having a length at least five times greater than a width."

For purposes of this disclosure the following directional indicators are used. The directions are relative to a relative direction moving towards a face of a block which is against the container (or "bottom wall") and towards the container (or "bottom wall"). Therefore, "top" refers to a side opposite the bottom side, e.g. the top face of the block whereas the "bottom" face of the block is against the container. "Left" and "Right" are therefore at substantially and/or entirely perpendicular ends of the block relative to the "top" and "bottom" sides of the block and the directions of "top", "bottom", "left", and "right" for other devices or portions thereof in the description are relative to these directions.

BRIEF DESCRIPTION OF THE DRAWINGS

FIG. 5*a* shows a top and right side perspective view of the resilient prismatic block of the tacklebox of FIG. 1.

FIG. 5*b* shows a side elevation view of the resilient prismatic block of the tacklebox of FIG. 1.

DETAILED DESCRIPTION OF EMBODIMENTS OF THE DISCLOSED TECHNOLOGY

A fishhook carrying device has a resilient prismatic block, of which two adjacent faces are cut into by at least one set of spaced grooves extending along a longest dimension thereof. Two opposite parallel grooveless faces thereof abut two rigid exterior walls, which, along with a connecting bottom wall, form a unitary box structure. Rigid exterior walls of either side of the box structure maintain the prismatic block in a compressed form such that interior walls of each groove are pressed against each other in a first resting condition. When a flange is inserted into a pressed groove, the interior walls of the groove resiliently separate and thereafter abut the flange, frictionally holding the flange in place. The interior groove walls return to the first resting condition upon removal of the flange from the device.

Embodiments of the disclosed technology will become more clear in view of the following discussion of the drawings.

Figure 1:
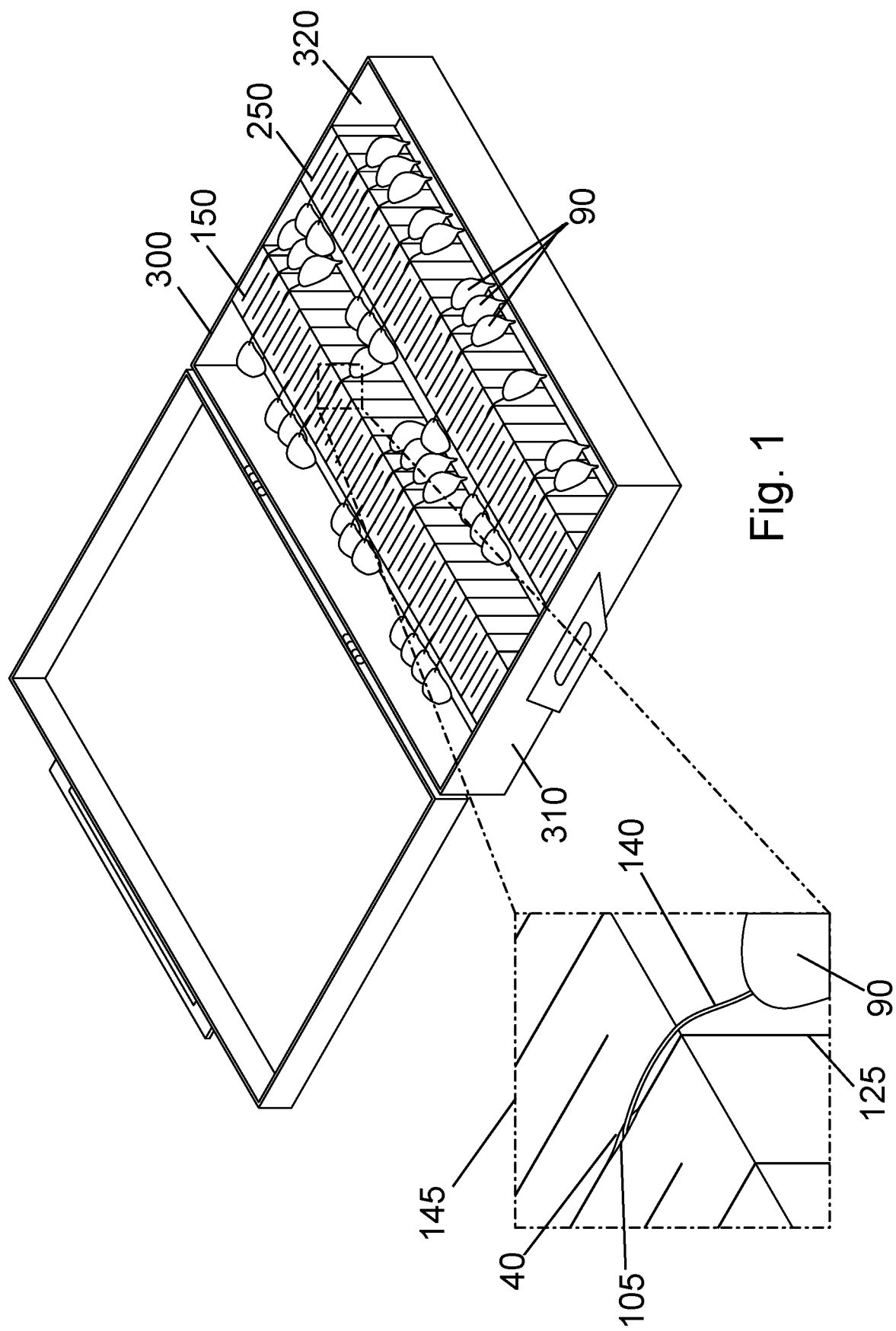
FIG. 1 shows a top and side perspective view of a tacklebox of an embodiment of the disclosed technology.

FIG. 1 shows a top and side perspective view of a tacklebox of an embodiment of the disclosed technology. Two resilient prismatic blocks 150 and 250, each of which comprise two parallel sets of equidistantly spaced grooves, are frictionally held in place within a unitary rigid structure 300. Described differently, the device depicted comprises two pluralities of spaced apart portals within elongated, resilient, and compressible holders 150 and 250. (For purposes of this disclosure, the terms "groove" and "portal" may be used interchangeably).

Figure 2:
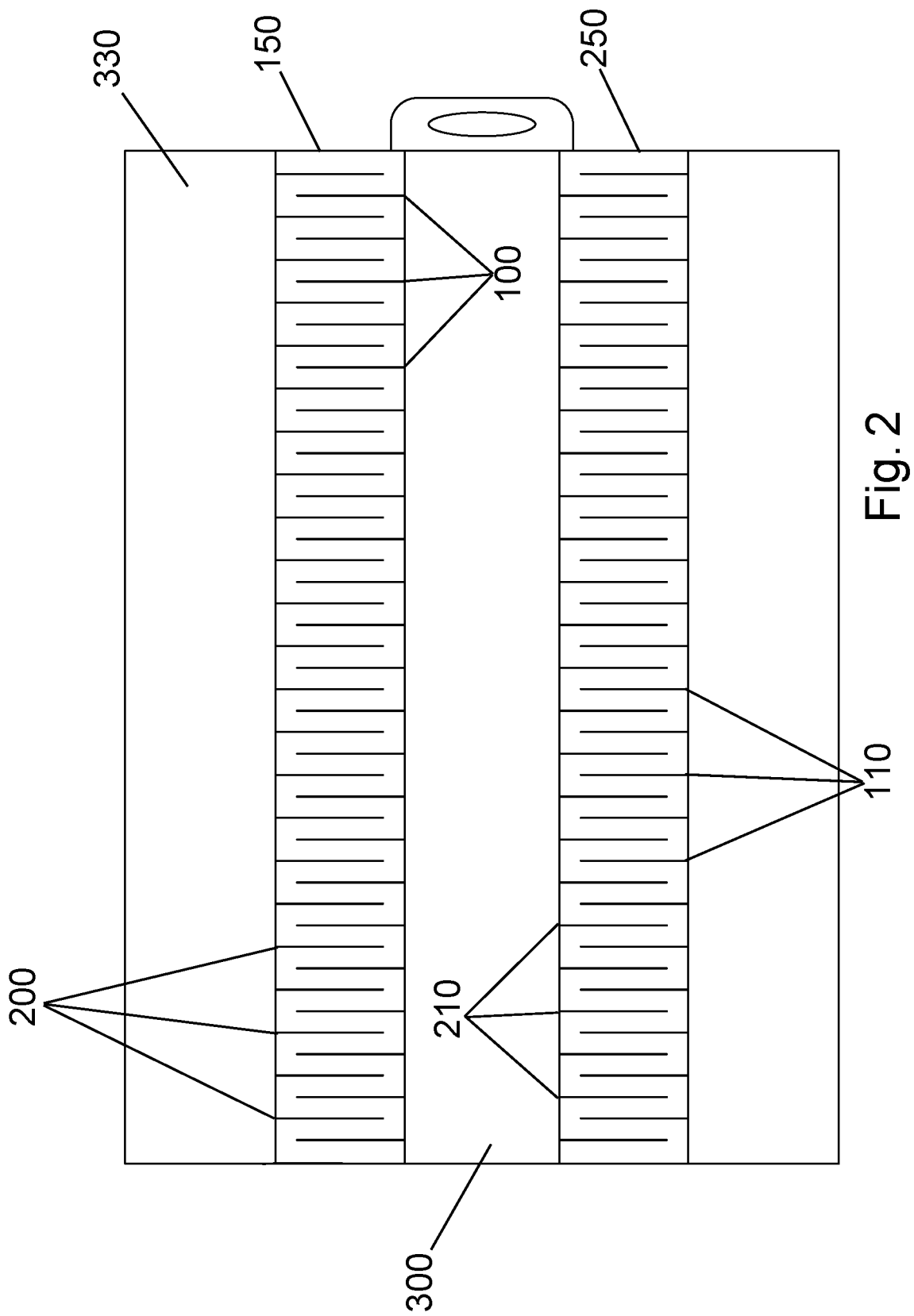
FIG. 2 shows a top plan view of the tacklebox of FIG. 1.

FIG. 2 shows a top plan view of the tacklebox of FIG. 1. First and second resilient prismatic blocks 150 and 250 are shown abutting the rigid exterior bottom wall 330 of the unitary rigid structure 300. The first resilient prismatic block 150 comprises two sets of substantially equidistant substantially parallel grooves 100 and 200. The second resilient prismatic block comprises two sets of substantially equidistant substantially parallel grooves 110 and 210. Each groove of a set of grooves is spaced substantially equidistantly between two adjacent grooves of the said same set of grooves. Furthermore, the distance between a groove and the two nearest grooves to said groove from a different set of grooves on the same resilient prismatic block is substantially equal. The first and second resilient prismatic blocks 150 and 250 may be substantially identical to one another, as in the depicted embodiment. In other embodiments, the dimensionality and spacing of the grooves may vary between the first and second resilient prismatic blocks 150 and 250. A box or other apparatus comprising a unitary rigid structure) may comprise one, two, or a greater plurality of resilient prismatic blocks, each of which may be substantially identical to one another and/or vary with respect to depth and distance between each groove thereof.

Referring simultaneously to FIG. 1 and FIG. 2, the holders 150 and 250 are each pressed against (held within and held between) two walls 310 and 320 of the unitary rigid structure 300, each wall of said walls 310 and 320 being at opposite ends of one another with respect to the holders. The portals therein are pressed, pushed, or held closed by at least in part by compression forces acting upon the holders, the longest dimension of each of the holders 150 and 250 being substantially equal or equal to a distance between two opposite and substantially parallel walls 310 and 320 of the unitary rigid structure 300.

Skipping to FIG. 5*a*, FIG. 5*a* shows a top and right side perspective view of the resilient prismatic block 150 of the tacklebox of FIG. 1. The prismatic block is resilient in embodiments of the disclosed technology. Such a resilient prismatic block 150 has a longest linear length 20, which is the longest line segment bounded at both ends by faces, such as faces abutting side walls of the box of the resilient prismatic block 150, said line 240 segment being parallel to at least one edge of the resilient prismatic block. Edges are the lines along which faces of the resilient prismatic block converge. For example, in the embodiment shown, faces 30 and 40 converge, forming the upper right edge (to which the longest linear length 20 is parallel) of the block 150. The longest linear length 20 is, in the depicted embodiment, itself an edge at the line of convergence of face 30 and a non-depicted bottom face of the block. (Note that the longest linear length 20 is a measurement and is therefore not limited to a said specific line segment within a three dimensional space, as an infinite amount of line segments meet the conditions of the longest linear length. Thus, the placement of longest linear length 20 in the figure is meant to be illustrative but not positionally limiting to only the specific edge between face 30 and the not depicted bottom face.)

Faces 30 and 40 are a pair of adjacent faces, which, in the depicted embodiment of the disclosed technology, are substantially perpendicular to one another. Cut into both faces 30 and 40 is a first set of substantially equidistantly spaced substantially parallel grooves 100. This set of parallel grooves spans the majority of the longest linear length 20 of the block. Said another way, along the majority of the length of at least one of the longest faces of the block, a set of parallel grooves is found on said face. Furthermore, in some embodiments, a second set of substantially equidistantly spaced substantially parallel grooves 200 is present. The grooves of this set 200 are cut into face 40 and a not-depicted face that is substantially parallel to face 30. Face 40 is thus cut into by both sets of grooves.

Grooves of the two sets of grooves 100 and 200 cross a same line of symmetry of the face common to both sets 40. This same line of symmetry may be of the same dimensionality of the longest linear length 20 and may be along an edge. In this case, in order to cross the described same line of symmetry, every groove must reach more than half-way to the edge in which the opposite set of grooves is cut. Another same line of symmetry may be diagonal with respect to face 40. In this case, the described same line of symmetry may extend between two vertices of the block, the first of which is at the confluence of face 40, the face parallel to face 30, and the face parallel to face ten, the second vertex being at the confluence point of face 40, face 30, and face 10. In the embodiment where it is this described diagonal line of symmetry that is spanned, the minimum length of each groove need not be uniform, unlike in the case of the firstly described line of symmetry. Another diagonal line of symmetry may be considered, the line connecting a vertex at the confluence of face 40, face 10, and the face parallel to face 30 and a vertex at the confluence of face 40, the face parallel to face 10, and face 30. Note that while the length of each groove may vary, a minimum length of each groove (which may or may not vary between each groove based on a positioning of each groove) must be achieved by each groove of the tackle box device.

The two sets of substantially equidistantly spaced substantially parallel grooves 100 and 200 are positioned, in some embodiments (such as that depicted in FIG. 5a), such that the grooves along a same face 40 alternate between being from the first set 100 and the second set 200 or vice versa. Along the non-diagonal line of symmetry crossed by every groove in FIG. 6a, any groove whose ordinal number is even is a groove of the first set of grooves 100, while any groove whose ordinal number is odd is a groove of the second set of grooves 200 or vice versa. (The aforementioned ordinality refers to a labeling of each successive groove with a number starting at one and incrementing by one for each successive groove along said line of symmetry. The groove that is ordinally first is a groove closest to a non-longest face, such as the groove closest to face 10.) Furthermore, the distance along the line of symmetry between any two ordinally adjacent grooves is, in some embodiments, substantially equivalent.

FIG. 5b shows a top elevation view of a cross sectional face of the block 150 of FIG. 6a. This cross sectional face may be grooveless face 10. This cross sectional face has edges 2, 4, 6, and 8.

Referring now to the inset 145 of FIG. 1, and the figures in general, the sets of portals/grooves 100, 110, 200, and 210 extend along this longest dimension of each holder, respectively. Each portal is cut into a pair of adjacent faces of said holder. In the embodiment shown, each respective holder has two distinct sets of parallel grooves. Both sets of portals are cut into a same face 40 (as shown in the inset 145), whilst each set is also cut into a non-same face adjacent to said same face 40, said first of portals 315 being cut into a first adjacent face that is substantially parallel to a second adjacent face into which said second set of portals is cut. Each set of portals extends across a longest dimension of the holder, alternatingly with respect to the other set. Described differently, the closest groove to an endpoint of a first groove, said endpoint not being on an edge of said holder, is, in some embodiments, a groove of a different set than the set of said first groove in question.

Each portal, such as portal 125 (shown in the inset 145) of the device comprises two interior walls 105, each of said walls being compressed against one another in a first configuration, such that said walls substantially or fully abut one another. The first configuration is one in which the portal 125 is without a flange therein and the block 150 is frictionally pressed between side rigid exterior walls 70/80. However, the insertion of a flange 90 resiliently separates said two interior walls 105 of the portal 125, such that the interior walls 105 are separated from one another at a location where the flange 90 is placed or occupies. A flange 90 may be a fishing hook, lure, barb, or other similarly sized fishing implement.

When a flange 90 is inserted into a portal, such as portal 125, the interior walls 105 of the portal are partially separated. The partial separation is at, at least, a location where the flange 90 is placed. The flange 90 is then held in place due to frictional forces because the walls 145 of the portal 125 press against the flange 90. The abutment with respect to said two interior walls 105 of a portal 125 is/are such that said flange 90 is substantially or fully held in place with respect to the resilient prismatic block 150 due to static frictional forces generated between said flange and said interior walls 105. The flange 90 can be removed from said portal 125 by pulling the flange away from the portal in a matter which overcomes the static frictional forces holding the flange in place. After the flange 90 is removed from the portal 125, the interior walls 105 of the portal resiliently reassume the first configuration. Thus, the interior walls 105 substantially abut one another again along an entire or substantially entire interior thereof.

Figure 4:
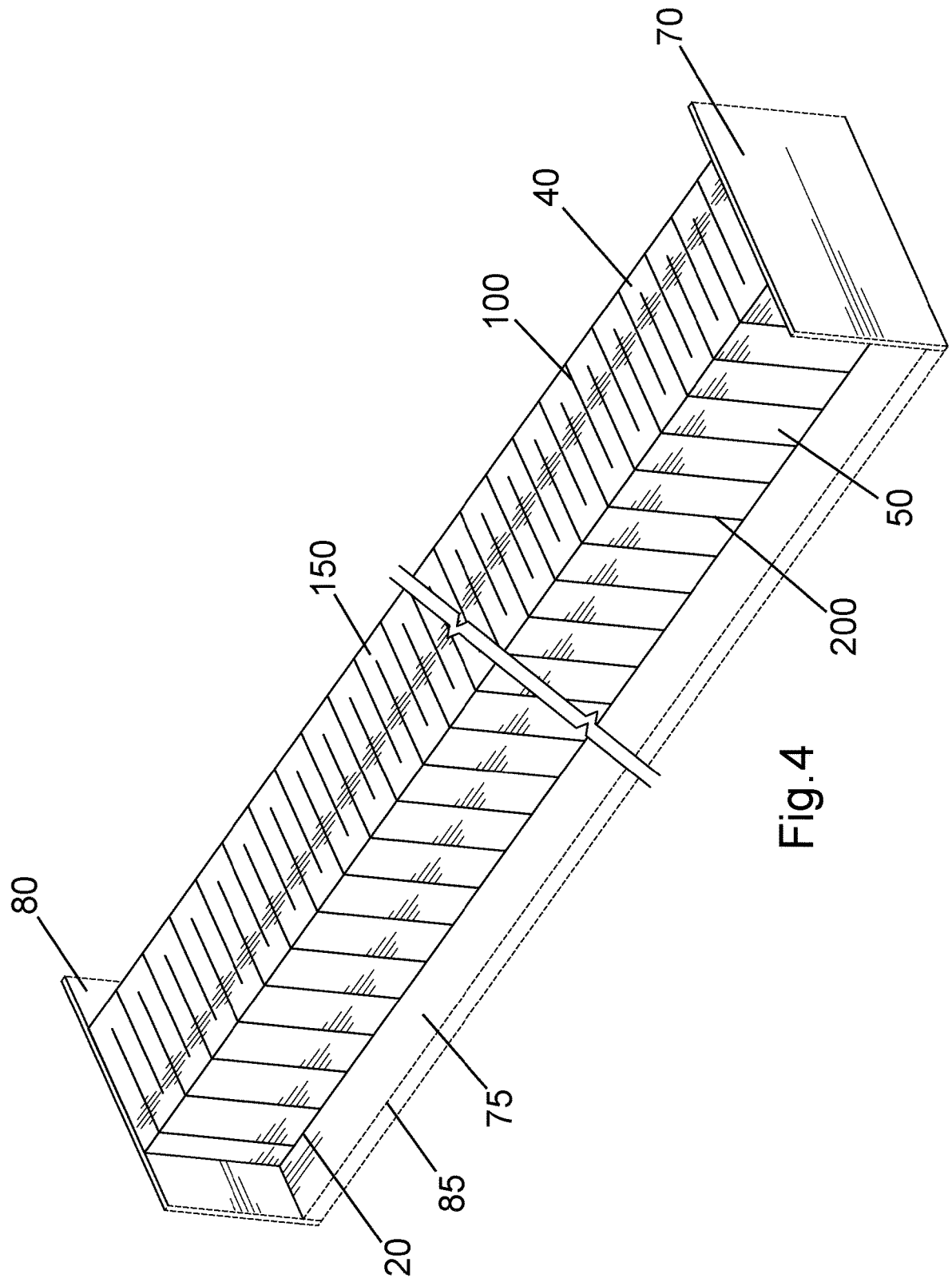
FIG. 4 shows a top and left-side perspective view of a resilient prismatic block and abutting walls of the tacklebox of FIG. 1.

FIG. 4 shows a top and left side perspective view of the resilient prismatic block 150 and abutting walls of the tacklebox of FIG. 1. Shared face 40 and face 50 are cut into by the second set of grooves 200, face 50 being parallel to face 30 (as depicted in FIG. 5a). A rigid first exterior side wall 70 extends substantially along the first grooveless face of the block 150. A rigid second exterior side wall 80 extends substantially along a second grooveless face that is substantially parallel to said first grooveless face. A rigid exterior bottom wall 75 substantially extends along and abuts a grooveless face substantially parallel to shared face 40. This grooveless face may also be referred to as a "first end" of the block. In some embodiments, the rigid exterior side walls 70 and 80 are both perpendicular to the rigid exterior bottom wall 75. The rigid exterior walls 70, 75, and 80 may comprise a unitary structure. The distance 85 between the two rigid exterior side walls 70 and 80 is substantially equal in measure to said longest linear length 20 of the block 150, wherein said longest linear length 20 is measured when every groove of both sets of grooves 100 and 200 is in a state such that the two side walls thereof are compressed against one another, or, described differently, no groove is affixing an inserted flange within itself.

The block 150 may be substantially held in place with respect to said rigid exterior side walls 70 and 80 by an, adhesive, a connector, or combination thereof such as in conjunction with compression of the block applied along a length of the block. In this case, said length is the longest linear length 20 and said two grooveless faces are the faces substantially abutted and extended along by the rigid exterior side walls 70 and 80. Described differently, the length 85 between the two rigid exterior side walls 70 and 80 is substantially equal to the longest linear length 20 of the block 150, such that the said rigid exterior side walls 70 and 80 press against block 150, thereby substantially holding the prismatic block 150 in place.

Figure 3:
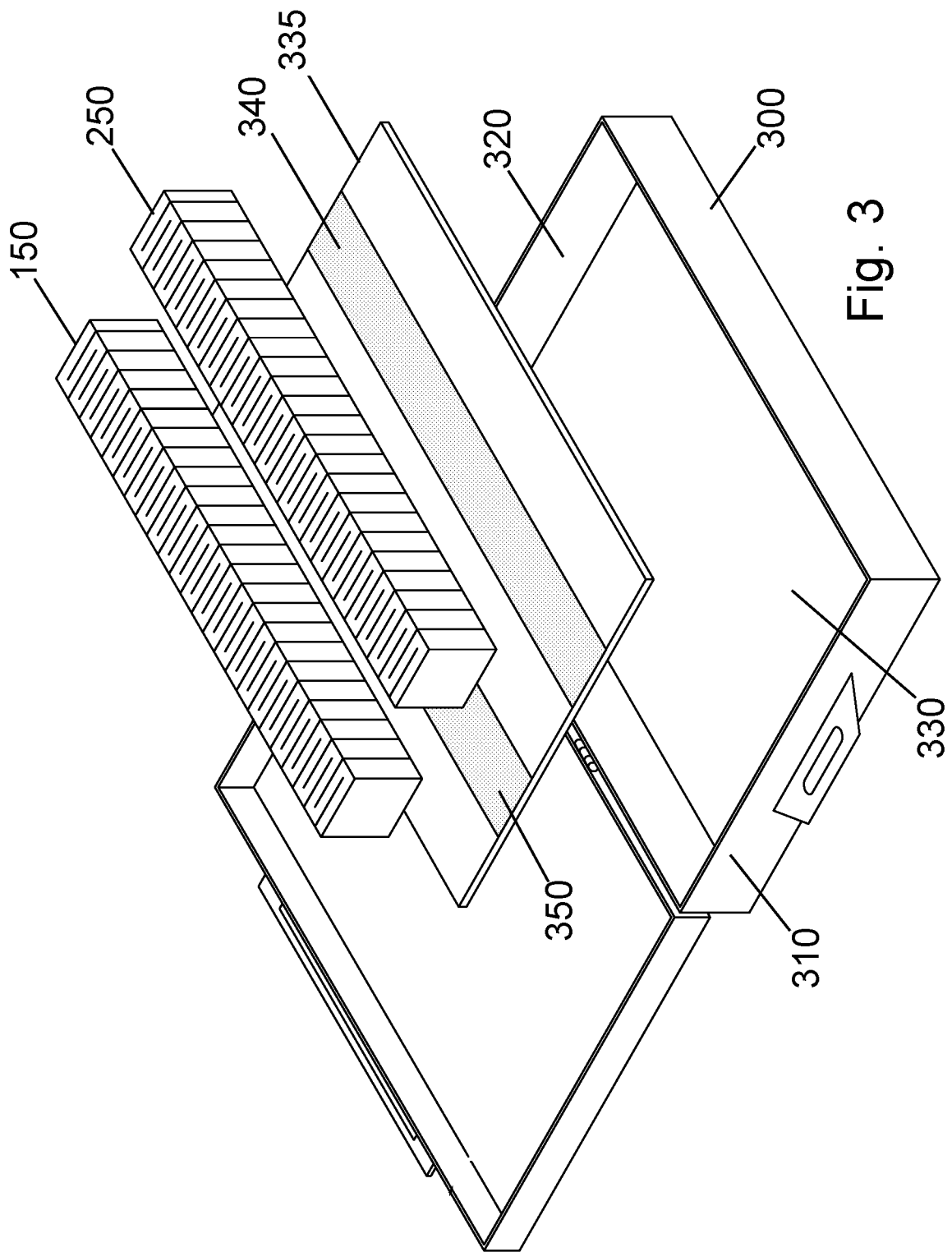
FIG. 3 shows an exploded top-side perspective view of the tacklebox of FIG. 1.

FIG. 3 shows an exploded top-side perspective view of the tacklebox of FIG. 1. The unitary box structure 300 comprises rigid side exterior walls 310 and 320 and a rigid bottom wall 330. While an insert 335 is shown in FIG. 3, it should be understood that this insert forms part of the rigid bottom exterior wall 330 of the unitary box structure 300 when abutted thereto. The bottom faces of two resilient prismatic blocks 150 and 250 abut two regions 350 and 340 of the bottom wall 330 (which can include the insert 335). Adhesive or a mechanical connector may be placed on the two regions 350 and 340 to further secure blocks 150 and 250 respectively to the insert 335 and/or bottom wall 330, beyond the substantial securement provided by compressional forces generated by the abutting of the two rigid exterior side walls 310 and 320 against two grooveless faces of each of the two blocks 150 and 250. The rigid exterior bottom wall 330 may be affixed within structure 300, rendering structure 300 unitary. The unitary structure 300 may be configured with further accouterments in a manner that assists the user of the tacklebox in storage or usage thereof.

For purposes of this disclosure, the term "substantially" is defined as "between 95% and 100%, inclusive" of the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

The term "and/or" is inclusive of the items which it joins linguistically, and each item by itself.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A device comprising:
a resilient prismatic block;
a first set of parallel grooves in said resilient prismatic block spaced equidistantly from each directly adjacent groove of said first set of parallel grooves;
a rigid first exterior side wall abutting at least substantially along an entirety of a first grooveless face of said resilient prismatic block;
a rigid exterior bottom wall abutting a first end of said resilient prismatic block;
a rigid second exterior side wall abutting a second grooveless face of said resilient prismatic block. said first grooveless face and said second grooveless face being on opposite sides of said resilient prismatic block; and
wherein each groove of said first set of parallel grooves comprises a first interior side wall compressed against a second interior side wall and
each groove of said first set of parallel grooves extends into a first pair of adjacent faces of said resilient prismatic block.

2. The device of claim 1 further comprising:
a second set of parallel grooves in said resilient prismatic block spaced equidistantly from each directly adjacent groove of said second set of parallel grooves; and
each groove of said second set of parallel grooves extending into a second pair of adjacent faces of said resilient prismatic block, wherein a second face of said second pair of adjacent faces and a first face of said first pair of adjacent faces are the same face.

3. The device of claim 2, wherein:
a second face of said first pair of adjacent faces is parallel to a first face of said second pair of adjacent faces.

4. The device of claim 3, wherein:
each groove of said first set of parallel grooves and each groove of said second set of parallel grooves are parallel to one another and alternate, along a same face, between a groove of said first set of parallel grooves and a groove of said second set of parallel grooves.

5. The device of claim 4, wherein:
each said groove of said first set of parallel grooves and each groove of said second set of parallel grooves traverses a same line of symmetry of said same face.

6. The device of claim 1, wherein:
a longest linear length of said resilient prismatic block, in a state where each said groove has said first interior side wall compressed against said second interior side wall, is substantially equal to a distance between said rigid first exterior side wall and said rigid second exterior side wall.

7. The device of claim 1, wherein:
said rigid first exterior side wall and said rigid second exterior side wall are perpendicular to said rigid exterior bottom wall.

8. The device of claim 1, wherein:
said rigid first exterior side wall, said rigid exterior bottom wall, and said rigid second exterior side wall form a unitary rigid structure.

9. The device of claim 8, wherein:
said resilient prismatic block is substantially positionally secured by compression with respect to said unitary structure, said compression applied along a length of said resilient prismatic block between said first grooveless face and said second grooveless face.

10. The device of claim 9, wherein:
said first interior side wall and said second interior side wall of each said groove is resiliently and non-destructively deformable.

11. The device of claim 10, wherein:
at least one said groove of said first set of parallel grooves has a removable flange frictionally held within, said flange separating said first interior side wall and said second interior side wall away from each other.

12. The device of claim 11, wherein:
said first interior side wall and said second interior side wall of each said groove return to being compressed against one another at a prior location of said removable flange when said removable flange is removed.

13. The device of claim 11, wherein:
said removable flange is a metal hook of a fishing lure with a sharp end protected within said at least one said groove and frictionally held therein, said metal hook stationary with respect to said resilient prismatic block when said metal hook is separating said first interior side wall and said second interior side wall away from each other and said metal hook is within said at least one said groove.

14. A device comprising:
a plurality of spaced-apart portals within an elongated, resilient, and compressible holder, said holder pressed against two walls, each said wall at an opposite end of said holder from each other said wall; and
wherein said portals are pressed closed and each portal is spreadable by a resilient flange placed therein and returns to a non-spreaded condition when the resilient flange is removed;
a rigid first exterior side wall abutting at least substantially along an entirety of a first grooveless face of said compressible holder;
a rigid exterior bottom wall abutting a first end of said compressible holder;
a rigid second exterior side wall abutting a second grooveless face of said compressible holder said first grooveless face and said second grooveless face being on opposite sides of said compressible holder.

15. The device of claim 14, wherein the resilient flange is a metal hook of a fishing lure with a sharp end protected within said portal and frictionally held therein, said metal hook stationary with respect to said compressible holder when said metal hook is spreading a portal of said portals of said compressible holder and held within said portal being spread.

16. The device of claim 15, wherein substantially only frictional forces hold said metal hook in a portal of said portals.

17. The device of claim 14, wherein said spaced-apart portals are two sets of spaced-apart portals alternatingly extending across a longest extent of said compressible holder.

18. The device of claim 17, wherein a first set of said two sets of spaced-apart portals is cut into a first pair of faces of said compressible holder and a second set of said two sets of spaced-apart portals is cut into one face of said first pair of faces and an additional face outside of said first pair and adjacent to said one face of said first pair.

19. The device of claim 14, wherein each said wall on either end of said holder is a wall of a container having a bottom wall joining between each said wall one said either end of said holder.

* * * * *